US006519708B1

(12) United States Patent
Chang

(10) Patent No.: US 6,519,708 B1
(45) Date of Patent: Feb. 11, 2003

(54) CHIP SET COMPRISING ONLY GRAPHIC INTERFACE REFERENCE VOLTAGE PIN

(75) Inventor: Nai-Shung Chang, Taipei Hsien (TW)

(73) Assignee: Via Technologies, Inc., Taipei Hsien (TW)

( * ) Notice: Subject to any disclaimer, the term of this patent is extended or adjusted under 35 U.S.C. 154(b) by 0 days.

(21) Appl. No.: 09/436,141

(22) Filed: Nov. 9, 1999

(30) Foreign Application Priority Data

Mar. 29, 1999 (TW) ....................................... 88104901 A

(51) Int. Cl.[7] .............................. G06F 1/26; G06F 9/00

(52) U.S. Cl. ....................................... 713/340; 709/323

(58) Field of Search ......................... 713/340; 709/323; 707/526; 370/537

(56) References Cited

U.S. PATENT DOCUMENTS 5,886,657 A * 8/1997 Ahuja ........................... 327/1

* cited by examiner

Primary Examiner—Thomas Lee
Assistant Examiner—Suresh K Suryawanshi
(74) Attorney, Agent, or Firm—J.C. Patents

(57) ABSTRACT

A chip set comprising only one graphic interface reference voltage pin. The chip set is installed onto a mother board to control accelerated graphics port. An example of the chip set comprises a corecircuit, a multiplexer, and a comparator. Only one graphic interference voltage lead is required to obtain the required internal reference voltage under different modes. Another example of the chip set connects to a multiplexer by the only graphic interface reference voltage pin. By coupling two pins of the mother board and the accelerated graphics accelerated port, the internal reference voltage can be controlled.

9 Claims, 4 Drawing Sheets

CHIP SET COMPRISING ONLY GRAPHIC INTERFACE REFERENCE VOLTAGE PIN

CROSS-REFERENCE TO RELATED APPLICATION

This application claims the priority benefit of Taiwan application serial no. 88104901, filed Mar. 29, 1999.

BACKGROUND OF THE INVENTION

1. Field of the Invention

The invention relates to a chip set for controlling a graphic system, and more particularly, to a chip set comprising only one graphic interface reference voltage pin for controlling a accelerating graphic system of an accelerated graphics port (AGP).

2. Description of the Related Art

Though being widely applied, the three-dimensional graphic system has a very low operation speed due to large quantity of data to be processed. To resolve the problem of an input/output jam, a new channel has been developed by manufactures. The new channel, that is, an accelerated graphics port is used to directly connect a graphic chip and a chip set on a mother board. Currently, the accelerated graphics port includes a single-edge-clocked (1×), a double-edge-clocked (2×), and a quad-edge-clocked (4×) transfer modes to transfer data between the graphic chip and the chip set for controlling the accelerating graphic system.

FIG. 1 schematically shows a reference voltage circuit of the accelerated graphics system while an accelerated graphics port is operated under a single-edge-clocked transfer or a double-edge-clocked transfer mode. The reference input/output supply voltage Vddq of the mother board is 3.3 volt. The chip set 10 is coupled to the mother board with a divided voltage of the reference input/output supply voltage $V_{DDQ}$ of about 1.32 volt as a reference voltage.

In FIG. 2, shows a schematic drawing of a reference voltage circuit of the accelerated graphics system while an accelerated graphics port is operated under a quad-edge-clocked transfer mode. Since the operation speed of the quad-edge-clocked transfer mode is faster, an internal reference voltage required by the chip set is smaller to obtain the faster operation. Under the quad-edge-clocked transfer mode, the internal reference voltage of the accelerated graphics system is often of about 0.75 volt. However, with a smaller internal reference voltage, the chip set very often fails to determine a correct answer according to an input detecting potential while the reference input/output supply voltage of the mother board is unstable. To solve this problem, the internal reference voltage of the core circuit 21 in the chip set 20 uses a reference input/output supply voltage of a display card provided by the mother board as a voltage source. After being divided, the source voltage is provided to the core circuit 21 via a pin 25 of an accelerated graphics port 24. Similarly, a graphic chip 23 on the display card 22 uses a divided voltage of the reference input/output supply voltage provided by the mother as a voltage source via another pin of the accelerated graphics port 24. The divided voltages of both the graphic chip 23 and the core circuit 21 are the same. Therefore, under a circumstance that the reference input/output supply voltage is unstable, though the reference voltages of the graphic chip 23 and the core circuit 21 jump accordingly, the potential difference between these two divided voltages remain constant. The data determination is thus unaffected.

In FIG. 3, a reference voltage circuit of a accelerated graphics system applicable for operations under a single-edge-clocked, a double-edge-clocked, and a quad-edge-clocked transfer modes is shown. According to specific requirement, many chip sets are designed to work under different transfer modes. A chip set 30 comprises two pins coupled to an internal reference voltage source. One of the pins is coupled to a mother board 36 to receive the internal reference voltage from the mother board while the accelerated graphics port 34 is operated under the single-edge-clocked or the double-edge-clocked transfer mode. Whereas, the other pin is coupled to an accelerated graphics port 34 to obtain the internal reference voltage while the accelerated graphics port 34 is operated under the quad-edge-clocked transfer mode. However, apart from the very complex connection, additional pins are required for the chip sets. Typically, the internal layout of the chip set is complex enough. With an additional internal reference voltage source, the layout problem becomes even more complex.

SUMMARY OF THE INVENTION

The invention provides a chip set comprising only one graphic interface reference voltage pin. The chip set comprises a comparator, a multiplexer (MUX), and a core circuit. The comparator is used to compare to a reference input/output supply voltage with a mode determining reference voltage and to generate a mode signal according to the comparing result. The multiplexer is coupled to the comparator and an accelerated graphics port, so that an internal reference voltage is output thereby according to the mode signal generated by the comparator. The internal reference voltage can be either a division of the Reference input/output supply voltage or a graphic interface reference voltage provided by a display card. The core circuit is connected to the multiplexer. Using the internal reference voltage output by the multiplexer as reference, the input detecting potential level of the interface signal of the accelerated graphics port is determined.

The invention further provides a mother board system. The mother board and the accelerated graphics port are coupled to multiplexer, wherein the accelerated graphics port has two pins connected to the multiplexer. One of these two pins provides a graphic interface reference voltage, while the other provides a mode signal. The multiplexer thus selects an output of an internal reference voltage from either the Reference input/output supply voltage or the graphic interface reference voltage according to the mode signal.

In the invention, the chip set comprising only one graphic interface reference voltage pin to receive a graphic interface reference voltage thereby. The layout complexity of the chip sets applicable for accelerated graphics ports operated under different transfer modes is greatly reduced. Moreover, the reduction of the number of pins reduces the fabrication cost.

It is to be understood that both the foregoing general description and the following detailed description are exemplary and explanatory only and are not restrictive of the invention, as claimed.

DESCRIPTION OF THE PREFERRED EMBODIMENTS

Figure 1:
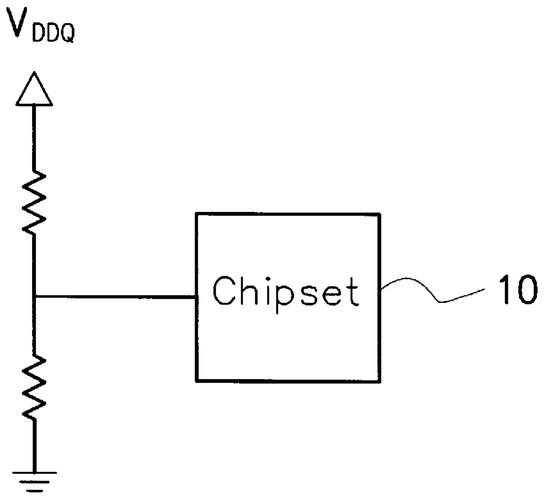
FIG. 1 (PRIOR ART)
FIG. 1 shows a schematic reference voltage circuit of a conventional accelerated graphic system with an accelerated graphics port operated under a single-edge-clocked or a double-edge-clocked transfer mode.
Figure 2:
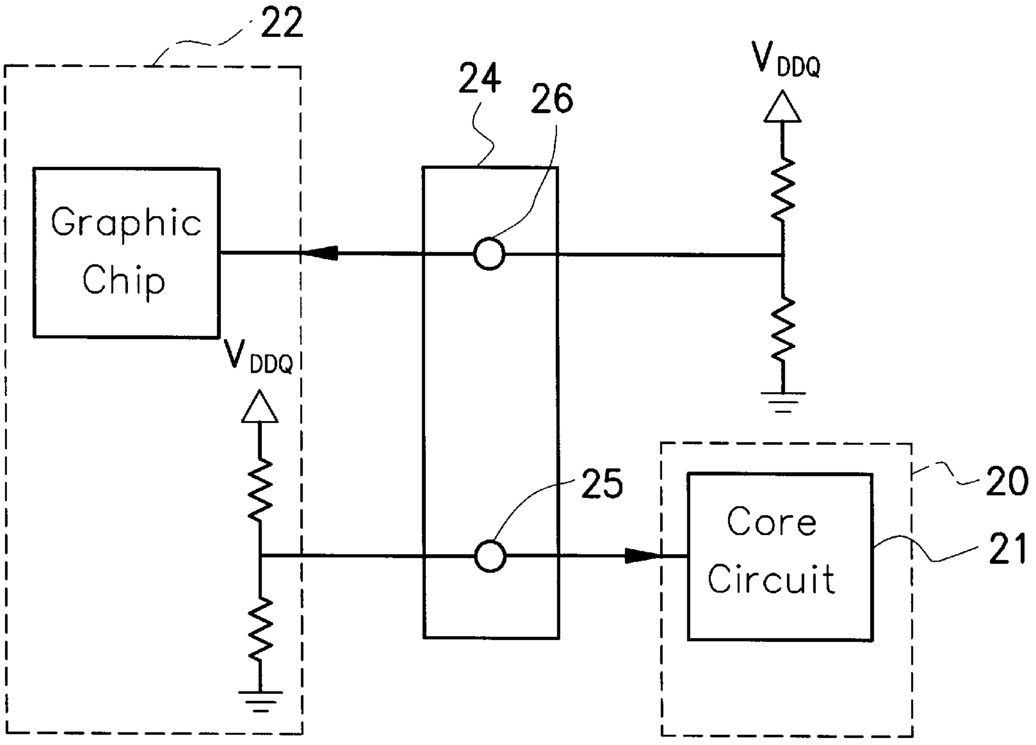
FIG. 2 (PRIOR ART)
FIG. 2 shows a schematic reference voltage circuit of a conventional accelerated graphic system with an accelerated graphics port operated under a quad-edge-clocked transfer mode.
Figure 3:
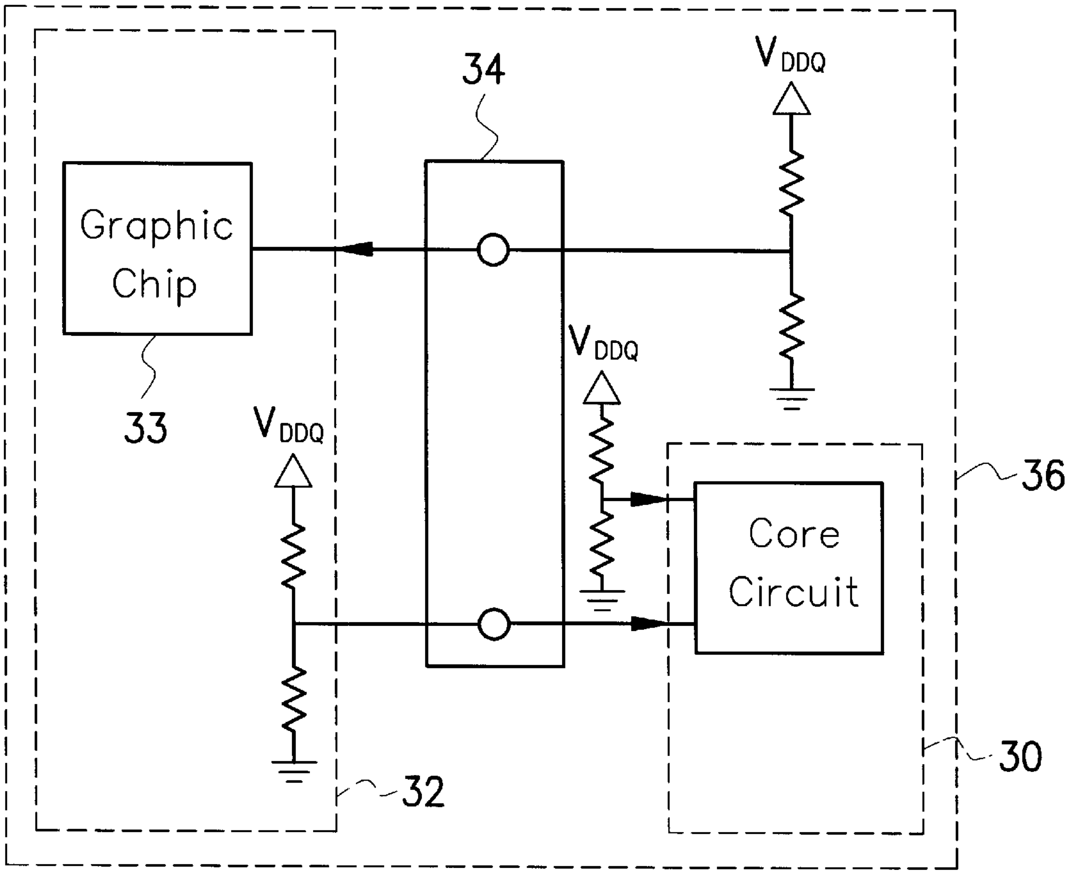
FIG. 3 (PRIOR ART)
FIG. 3 shows a schematic reference voltage circuit of a conventional accelerated graphic system with an accelerated graphics port applicable of being operated under a single clocked, a double-edge-clocked, or a quad-edge-clocked transfer mode.
Figure 4:
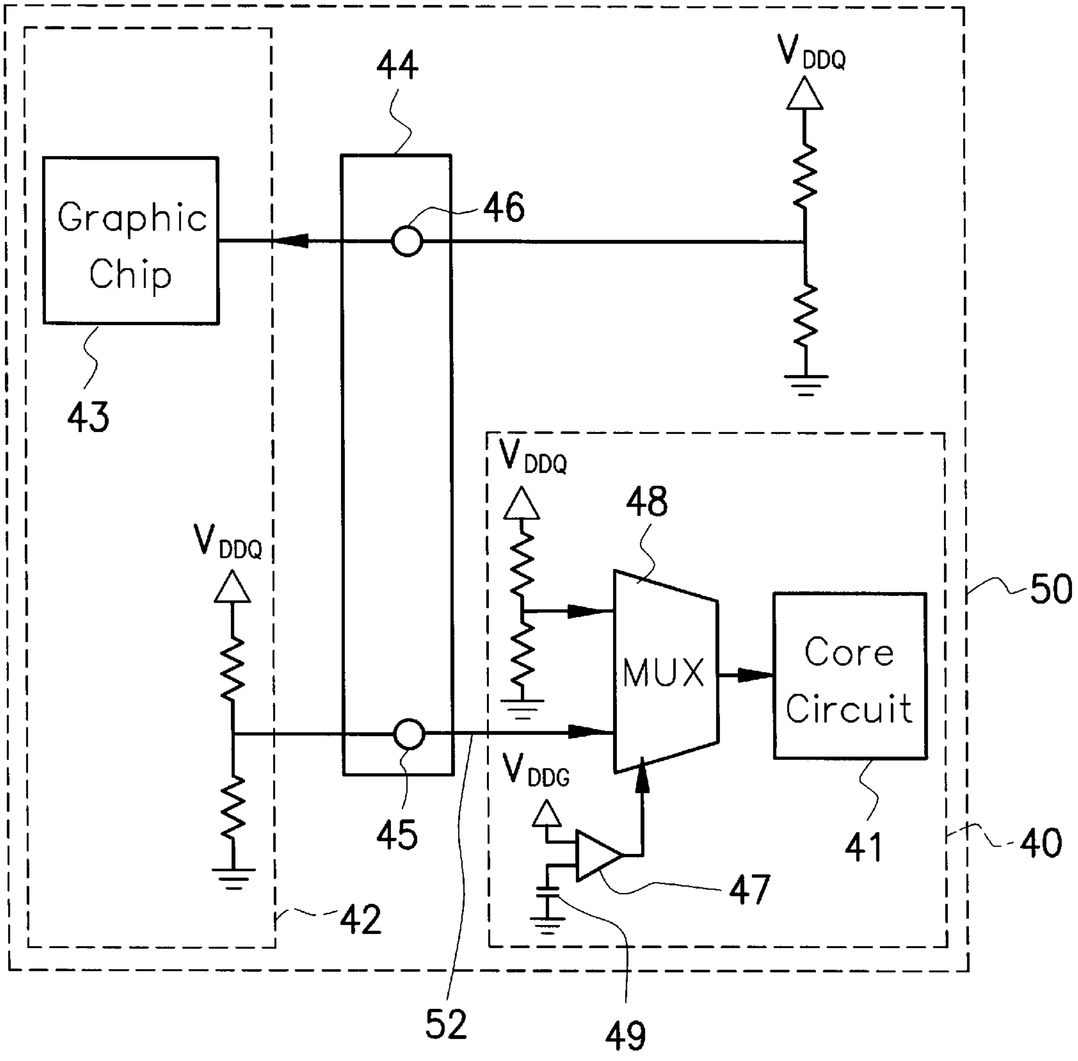
FIG. 4 schematically shows a reference voltage circuit of an accelerated graphic system of a chip set comprising only one graphic interface reference voltage pin according to an embodiment of the invention.

FIG. 4 schematically shows a reference voltage circuit of an accelerated graphic system of a chip set comprising only one graphic interface reference voltage pin according to an embodiment of the invention.

A chip set 40 on a mother board 50 comprises a comparator 47. The comparator 47 has two input terminals and one output terminal. One input terminal is to receive an Reference input/output supply voltage $V_{DDQ}$, and the other input terminal is coupled to a mode determining reference voltage supplier 49 to receive a mode determining reference voltage generated thereby. The output terminal of the comparator 47 is coupled to a multiplexer 48 to output a mode signal. In this embodiment, the mode determining reference voltage is about 2.2 volt. When the Reference input/output supply voltage is about 3.3 volt for a single-edge-clocked or a double-edge-clocked and larger than the mode determining reference voltage, the mode signal output from the comparator 47 to the multiplexer 48 is "high". On the contrary, when the Reference input/output supply voltage is smaller than the mode determining reference voltage, for example, about 1.5 volt, the mode signal is "low".

The multiplexer 48 is to select an output from several input terminals. In this embodiment, the multiplexer 48 has an input terminal used to receive a divided voltage of the Reference input/output supply voltage, and the other input terminal coupled to the only graphic interface reference voltage pin 52 of the chip set 40. The only graphic interface reference voltage pin 52 is coupled to the accelerated graphics port 44, so as to receive a graphic interface reference voltage provided by the accelerated graphics port 44 via a display card 42. In the embodiment, if a mode signal output by the comparator 47 is high, that is, while the accelerated graphics port 44 is operated under a single-edge-clocked or double-edge-clocked transfer mode, the multiplexer 48 outputs with a division of the Reference input/output supply voltage as the internal reference voltage. In contrast, if a mode signal output by the comparator 47 is low, that is, while the accelerated graphics port 44 is operated under a quad-edge-clocked transfer mode, the multiplexer 48 outputs with a graphic interface reference voltage provided by the accelerated graphics port 44 as the internal reference voltage.

Under a quad-edge-clocked transfer mode, the internal reference voltage varies because the graphic interface reference voltage provided by the display card 42 is delivered by one pin 45 of the accelerated graphics port 44. The reference voltage of the graphic chip 43 is provided by the mother board 50. The above is designed under the consideration of stability of data access. According to the specification of the quad-edge-clocked accelerated graphics port, the pin 46 is denoted as a B66 pin, and the pin 45 is denoted as an A66 pin. However, according to the specification of the single- or double-edge-clocked accelerated graphics port, A66 pin and B66 pin are reserved. That is, under the single- or double-edge-clocked transfer mode, the graphic interface interference voltage of the core circuit can not be obtained by the accelerated graphics port 44 via the same way.

Figure 5:
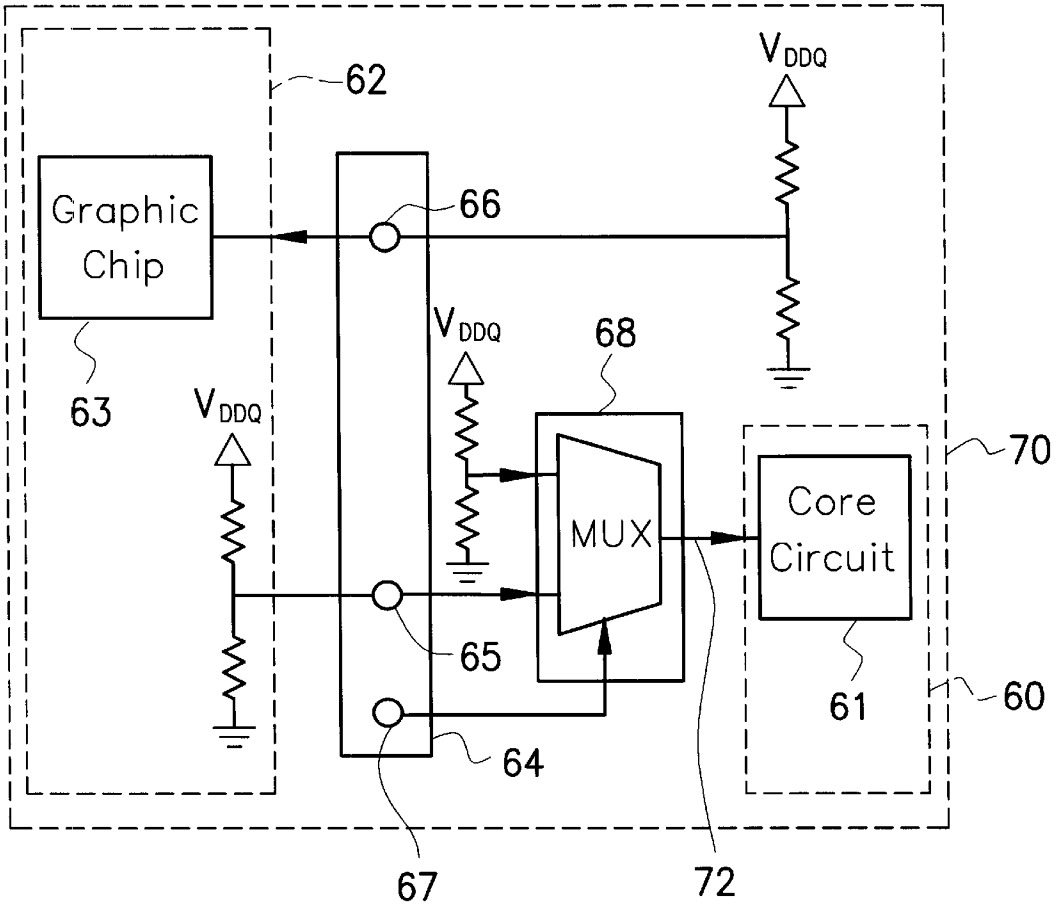
FIG. 5 schematically shows a reference voltage circuit of an accelerated graphic system of a chip set comprising only one graphic interface reference voltage pin according to another embodiment of the invention.

In FIG. 5, another embodiment of a circuit diagram of an accelerated graphic system comprising a chip set with only one graphic interface reference voltage pin is illustrated.

A reference voltage of a graphic chip 63 is provided by the mother board 70 via a pin 66 of the accelerated graphics port 64. When the accelerated graphics port 64 is operated under a quad-edge-clocked transfer mode, a graphic interface reference voltage of a chip set 60 comprising only one graphic interface reference voltage pin is provided by a display card 62 via a pin 65 of the accelerated graphics port 64. Again, the pin 65 is denoted as an A66 pin, and the pin 66 is denoted as a B66 pin.

In the embodiment, a mode signal is generated by the pin 67 of the accelerated graphics port 64 instead of a comparator. The pin 67 is a mode detecting pin (TYPEDET#) denoted as A2. A multiplexer 68 outputs an internal reference voltage according to the input mode signal. If the mode signal output by the pin 67 is high, the multiplexer 68 outputs with a division of an Reference input/output supply voltage provided by the mother board 70 as the internal reference voltage. In contrast, if the mode signal output by the pin 67 is low, the multiplexer 68 outputs with a graphic interface reference voltage delivered by the pin 65 of the accelerated graphics port 64 as the internal reference voltage. Via the only graphic interface reference voltage pin 72, the internal reference voltage provided by the multiplexer 68 is input to the core circuit 61, thereby, an input detecting potential level to determine an interface signal of the accelerated graphics mode is obtained.

Other embodiment of the invention will appear to those skilled in the art from consideration of the specification and practice of the invention disclosed herein. It is intended that the specification and examples to be considered as exemplary only, with a true scope and spirit of the invention being indicated by the following claims.

What is claimed is:

1. An accelerated graphic system, comprising:

a graphic chip, installed on a display card, the display providing a graphic interface reference voltage according to an input/output supply voltage;

an accelerated graphics port, coupled to the display card to provide a mode signal and to delivering the graphic interface reference voltage; and a chip set comprising only one graphic interface reference voltage pin, coupled to the accelerated graphics port to control the accelerated graphic system, the chip set further comprising:

a comparator, to generate a mode signal according to an input/output supply voltage and a mode determining reference voltage provided by the mother board;

a multiplexer, coupled to the comparator and the graphic interface reference voltage pin, and outputting an internal reference voltage selected from either a divided voltage of the input/output supply voltage or the graphic interface reference voltage according to the mode signal; and a core circuit, coupled to the multiplexer to determine an input detecting potential level of an interface signal of the accelerated graphics port according to the internal reference voltage.

2. The accelerated graphic system according to claim 1, wherein the chip set comprising only one graphic interface reference pin is applicable when the accelerated graphics port is operated under a single-edge-clocked, a double-edge-clocked, or a quad-edge-clocked transfer mode.

3. The accelerated graphic system according to claim 2, wherein the input/output supply voltage is about 3.3 volt when the accelerated graphics port is operated under the single- or the double-edge-clocked transfer mode.

4. The accelerated graphic system according to claim 2, wherein the input/output supply voltage is about 1.5 volt when the accelerated graphics port is operated under the quad-edge-clocked transfer mode.

5. A method of controlling an internal reference voltage of a chip set with only one graphic interface reference pin, the chip set comprising a comparator, a multiplexer, and a core circuit, the method comprising:

providing a mode determining reference voltage and an input/output supply voltage to the comparator, the comparator outputting a mode signal after comparing the mode determining reference voltage with the input/output supply voltage;

providing a graphic interface reference voltage, the input/output supply voltage, and the mode signal to the multiplexer, the multiplexer outputting an internal reference voltage selected from either a divided voltage of the input/output supply voltage or the graphic interface reference voltage according to the mode signal; and providing the internal reference voltage to the core circuit, the core circuit determining an input detecting potential level of an interface signal of the accelerated graphics port according to the internal reference voltage.

6. The method according to claim 5, wherein the method is applicable for controlling the internal reference voltage of a chip set with the accelerated graphics port operated under a single-, a double-, or a quad-edge-clocked transfer mode.

7. A mother board, comprising:

an accelerated graphics port, to provide a mode signal and a graphic interface reference voltage;

a multiplexer, coupled to the accelerated graphics port, outputting an internal reference voltage from either a divided voltage of an input/output supply voltage or the graphic interface voltage according to the mode signal; and a chip set comprising only one graphic interface reference voltage pin, with the graphic interface reference voltage pin coupled to the multiplexer, and to determine an input detecting potential level of an interface signal of the accelerated graphics port according to the internal reference voltage.

8. The mother board according to claim 7, wherein the chip set comprising only one graphic interface reference pin is applicable when the accelerated graphics port is operated under a single-edge-clocked, a double-edge-clocked, or a quad-edge-clocked transfer mode.

9. A method of controlling an accelerated graphic system which is installed on a mother board, the accelerated graphic system comprising a graphic chip, an accelerated graphics port, a multiplexer, and a chip set comprising only one graphic interface reference voltage pin, the method comprising:

providing an input/output supply voltage to the graphic chip by the mother board, so that a graphic interface reference voltage is generated and output to the accelerated graphics port according to the input/output supply voltage; and inputting the graphic interface reference voltage and a mode signal to the accelerated graphic port, the mother board providing the input/output supply voltage to the multiplexer to generate an internal reference voltage to the chip set comprising only one graphic interface reference voltage pin according to the mode signal, the internal reference voltage is selected from either the input/output supply voltage or the graphic interface reference voltage, so that the chip set comprising only one graphic interface reference signal can determine an input detecting potential level of an interface signal according to the internal reference voltage.

* * * * *